United States Patent [19]
Destree

[11] 4,320,887
[45] * Mar. 23, 1982

[54] TOOL SUPPORT FOR CONCRETE PILINGS

[76] Inventor: Allen L. Destree, 5218 92nd SW., Everett, Wash. 98204

[*] Notice: The portion of the term of this patent subsequent to Nov. 18, 1997, has been disclaimed.

[21] Appl. No.: 150,734

[22] Filed: May 19, 1980

Related U.S. Application Data

[63] Continuation-in-part of Ser. No. 952,916, Oct. 19, 1978.

[51] Int. Cl.³ .............................................. F16M 1/00
[52] U.S. Cl. .................................... 248/651; 248/124; 403/364
[58] Field of Search ............... 248/654, 651, 652, 657, 248/662, 660, 124; 173/43, 38, 28, 45, 44; 403/364; 408/104, 105; 211/182

[56] References Cited

U.S. PATENT DOCUMENTS

| | | | |
|---|---|---|---|
| 355,347 | 1/1887 | Sergeant | 248/651 X |
| 396,866 | 1/1889 | Foster | 248/651 X |
| 1,113,531 | 10/1914 | Ball | 173/43 X |
| 2,389,553 | 11/1945 | Sellars | 248/662 |
| 2,434,827 | 1/1948 | Akers | 248/662 X |
| 2,492,783 | 12/1949 | Chamberlain | 408/104 |
| 2,575,097 | 11/1951 | Cole | 248/651 |
| 3,148,001 | 9/1964 | Johnson | 173/43 X |
| 3,464,655 | 9/1969 | Schuman | 248/651 |
| 3,912,410 | 10/1975 | Pofferi | 403/219 X |
| 4,171,789 | 10/1979 | Hoek | 211/192 X |

FOREIGN PATENT DOCUMENTS

| | | | |
|---|---|---|---|
| 250623 | 11/1966 | Austria | 211/182 |
| 1433290 | 2/1966 | France | 211/182 |
| 2220975 | 10/1974 | France | 403/364 |

*Primary Examiner*—J. Franklin Foss
*Attorney, Agent, or Firm*—David L. Garrison; Randy A. Gregory

[57] ABSTRACT

A core drill stand for orienting and holding a core drilling apparatus for sampling concrete pilings, comprising an elongated column having a support collar fixed at right angles to the elongated column for engagement with the top of a concrete piling, gripping standoffs between the column and piling, a tightening collar to tighten the apparatus to the piling and a movable carriage means supported by the column, the carriage means being adjustable to fit closely about the column and having a pinion drive means engaging a rack on the column for moving the carriage along the column. The carriage is adapted to receive a pneumatic drilling device, other tools or additional columns. Columns are equipped with interfitting end hardware so that a plurality of columns may be joined endwise.

9 Claims, 7 Drawing Figures

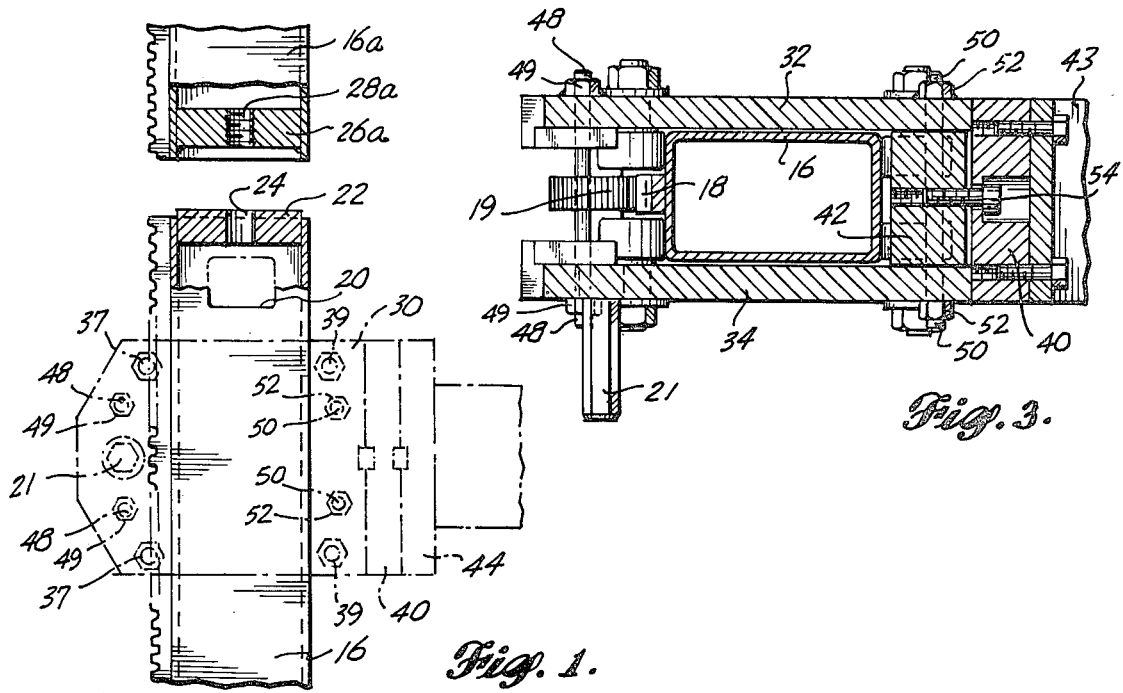
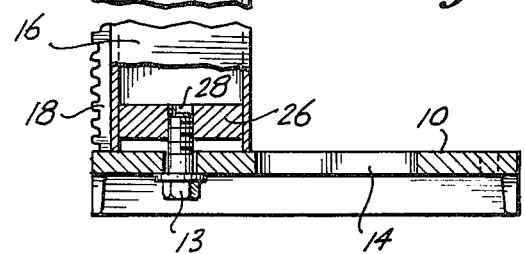
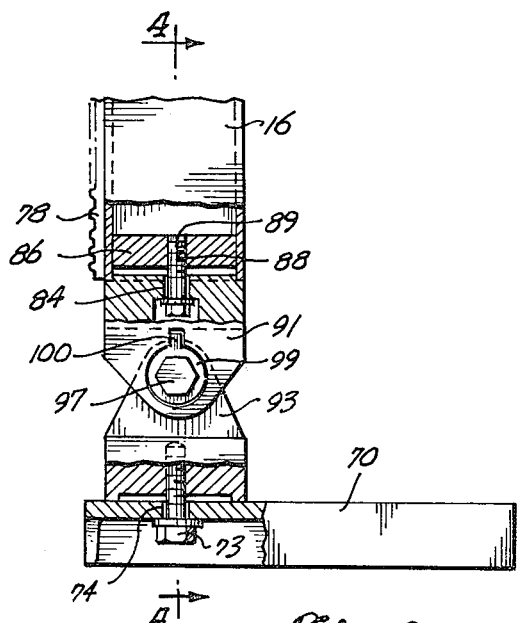
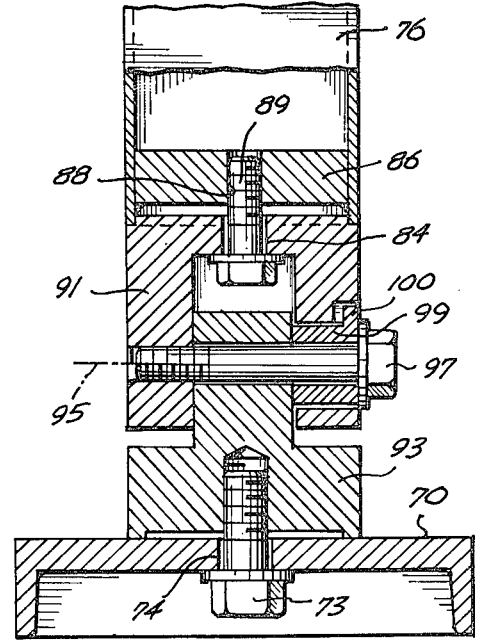

TOOL SUPPORT FOR CONCRETE PILINGS

RELATED PATENTS

This application is a continuation-in-part of my copending application Ser. No. 952,916 filed Oct. 19, 1978 entitled TOOL STAND.

TECHNICAL FIELD

Core drilling of concrete requires that the drill be held in a rigid and steady fashion. This invention relates to core drilling with rotational devices and more particularly to a stand for holding mechanically operated devices such as a core drill which stand is light, portable, yet provides a rigid but manipulatable stand for supporting the tool while the drill or saw moves into the concrete or rock.

BACKGROUND ART

The drilling of holes in concrete, as on construction sites, requires relatively large and heavy drills which are difficult to manipulate manually. Holes formed by the use of manually guided drills usually are not round and straight. Frequently drill bits are broken because their drive motors are not steady during the drilling operation.

To eliminate the above-mentioned undesirable effects and conditions, supporting structures have been devised to hold and guide the drill motor during the drilling process. These structures generally provide a base for mounting the drill, together with the motor powering the drill bit itself, to the surface in which a hole is to be drilled. Conventionally, a post is mounted on the base, the drill being guided toward and away from the surface along the post. The end of the post spaced from the base is steadied by a variety of devices, such as tie bars and support plates which are connected between the base and the post. A carriage is slidably secured to the post for mounting the drill, and it is known to drive the carriage mechanically along the post as by a rack and pinion mechanism.

In prior devices put into practice, the drill guide carriages are removable from the post only by removing the tie bars or support plates, e.g., from the end of the post farthest from the base, and by slipping the carriage over that end of the post. Because the carriage support structure had to be at least partially dismantled, removal of the drill-mounting carriage in prior coring and drill devices was cumbersome and time-consuming.

An adequately strong and rigid drill support base of the type of interest is a heavy structure in itself. Substantial weight is added to the support base by the carriage and the drill. The heavier the complete device, the more difficult it is to handle. When a hole is to be drilled on a vertical surface such as a wall, on an overhead surface such as a ceiling or in inaccessible places, the carriage and the drill usually have to be removed from the base to enable an operator to attach the base to such surface. After the base has been attached to the desired surface, the carriage, together with the drill mounted to it, must be slipped over the post of the prior art device. The tie bar must then be secured to the post before the drilling operation can commence.

Moreover, in practice, the carriages are frequently exchanged one for another in the substitution of one drill for another because each carriage is designed to mount a particular drill. Each time such a change is necessary, the apparatus must be dismantled and removed from the guide posts of prior devices, the carriage removed axially from the post, and a new one inserted.

Where a prior device is to be used high on a wall, the person attaching the carriage to the post has to reach back away from the wall (and away from a ladder or scaffold upon which the person may be standing) and guide the carriage and the drill motor onto the post. This procedure requires considerable physical effort and results in frequent accidents. These problems are especially acute where limited space is available and the operator has to work overhead.

An additional problem area is that of axial core drilling of concrete pilings and other manipulative operations at or near the end of a piling. Core drilling is used to extract a maximum amount of concrete from a piling prior to crushing the remaining concrete and severing the piling at a predetermined height. In the past, it has proven difficult to provide the core drill with the stability needed for drilling the concrete piling while still providing for a measure of apparatus portability and in-use flexibility.

The requirements of rigidity and non-yielding support for core drills has, in the past, resulted in the usage of large cumbersome devices for holding core drills. For example in U.S. Pat. Nos. 2,575,092 (Cole), 2,849,212 (Robbins), and 3,148,001 (Johnson), extensive anchoring to floor and ceiling or complicated linkage mechanisms are used to position, orient and impart drilling motion to the core drill or concrete saw apparatus. Similarly, in lighter less cumbersome devices, precision in locating the drill or saw is lacking since wear plates are necessary in the interfitting parts of the mechanism. Frequent maintenance is necessary particularly in the dust filled and gritty atmosphere in which such tools are used. The wear plates accumulate the abrasive dust and grind it into the mechanism. Examples of such devices are shown in U.S. Pat. No. 3,464,655 issued to A. Schuman.

These and other devices known to the prior art have a set overall size which is not readily dismantled for movement from job to job nor do they have the capability of readily positioning the core drill or saw in virtually any angular orientation.

OBJECTS OF THE INVENTION

It is an object of this invention to provide a tool stand which maintains the tool at a particular angular orientation in a secure and rigid fashion.

It is an additional object of this invention to provide a tool stand for engagement with a concrete piling so that a core drill mounted upon the tool stand may be efficiently and reliably used to drill the concrete within the piling.

It is a further object of this invention to provide a portable, piling engaging tool stand with a tool carriage movable lengthwise of support columns, said carriage being adjustable about the support columns for translation thereupon to manipulate a drill or other cutting devices into cutting engagement with a piling.

These and other objects and attributes of this invention will become apparent to one of skill in the art by examination of the appended drawings and review of the following description.

DISCLOSURE OF INVENTION

The tool stand described herein is constructed of three basic elements; namely, a piling engaging support means, one or more columns extending from said support means, and one or more carriage means adapted to closely encircle and translate along said columns. A plurality of column segments may be used to extend the length of the column segments in end-to-end relationship utilizing the unique end interengagement provided by a protruding block means positioned at one end of each column segment and a recessed block means positioned at the opposite end of each column segment. Interengagement of the column segments is achieved by insertion of projecting block of a first column into the recess formed by the periphery of the end of a second column and the recessed block positioned therein utilizing a bolt inserted through a bolt hole in the protruding block into a threaded hole in the recess block. The bolts draws the two end portions of the columns together with the protruding block nestled within the adjacent column keying the columns together to prevent relative rotation. Perimeter contact between adjacent columns results. A toothed rack is positioned on the outer surface of the rectangular columns and is engaged by a rotatable pinion carried by the carriage. Rotation of the pinion urges the carriage along the column and provides the necessary motion for the core drilling apparatus or other tool carried by the carriage.

For the core drilling of concrete pilings a column segment is equipped with piling engaging support means comprising standoff pads fixed thereto along one side and a support collar fixed perpendicularly to the column axis for engagement with the top of the piling. The column segment is mounted upon a concrete piling with the support collar resting atop the piling and the standoff pads between the column and the piling. A tightening means such as a chainlink tightening collar resembling a plumbers chain wrench is attached to the column segment and is used to tighten the column segment securely to the concrete piling. The carriage with an attached core drill can then be mounted on the column segment. Rotation of the pinion urges the carriage along the column and provides the necessary motion for the core drill bit to drill into the concrete piling.

The carriage noted above is comprised of a pair of opposed side plates which each carry cam follower type rollers each adapted for rotation about an axis which is perpendicular to the inner surface of the opposed side plates and which engage opposing surfaces of the column. The side plates are generally positioned adjacent each major surface of the rectangular column and are adjustably held in close proximity to the columns by a mechanism which will be described below. The rack on one side of the rectangular column is positioned between the rollers which traverse the surface carrying the rack. Rollers engaging the surface of the column opposite the rack are adjustable so that the distance between opposed rollers may be varied thereby accommodating minor variations in the size of columns used.

In order to avoid the need of wear strips, as are commonly used in prior art core drilling stands, the distance between the opposed first and second side plates is adjustable to close tolerances with the exterior of the rectangular column by means of a pair of bolts extending through the side plates and holes in a lock block positioned between the side plates. The side plates may be drawn into new engagement with the sides of the column. When the desired clearance is obtained, such as by use of a feeler guage or removable shim, the locking block is drawn toward an end plate by means of one or more cap screws so that the end plate engages the end edges of the first and second side plates in a secure substantially perpendicular clamped structure thus locking the structure with the close tolerance to the column. Locking bolts extending through the structure on the other side of the column from the width adjusting mechanism may be tightened to clamp the carriage structure about the column whenever it is desired to prevent motion of the carriage with respect to the column.

Any sort of drilling or cutting apparatus commonly used in the core drilling or sampling of concrete, geological formations, or the like may then be attached to the carriage means and be caused to travel along the column to perform the core drilling cutting or other operation desired on or near the end of the piling or other elongated member. If desired, additional column segments can be attached to the carriage to provide support columns at an angle to the first column segment having the piling engaging support means thereon.

BRIEF DESCRIPTION OF THE DRAWINGS

FIG. 1 is a side elevational view of the tool stand apparatus showing the segmented column construction.

FIG. 2 is a partial side elevational view of one variant form of the tool stand showing a pivotal base apparatus.

FIG. 3 is an enlarged cross-sectional view of the apparatus of FIG. 1 taken along lines 3—3 of FIG. 1.

FIG. 4 is a cross-sectional view of the apparatus in FIG. 2 taken along the lines 4—4 of FIG. 2.

DETAILED DESCRIPTION OF THE PREFERRED EMBODIMENT

Figure 7:
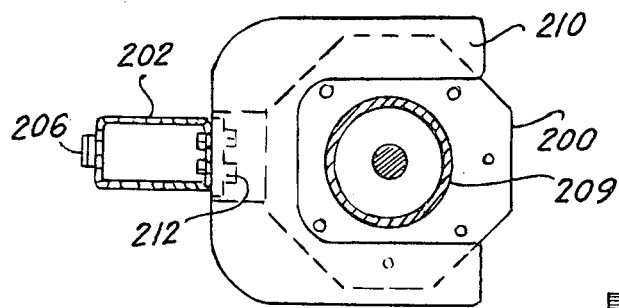
FIG. 7 is a cross-sectional view of the device shown in FIG. 6 taken along the line 7—7 of FIG. 6.

Referring specifically to the drawings wherein like numerals indicate like parts, Column 16 comprises an elongated rectangular rigid steel tube. The columns may be of any desired length but are preferably of approximately two feet (60 cm) to four feet (120 cm) in length. Each column has at one end a protruding block 22 fastened into the columns at one end thereof and a recessed block 26 fastened into the other end thereof, as best seen in FIG. 1. One of the blocks 22 or 26 has a hole in the center thereof large enough to receive a fastening bolt, (not shown in the figures). The other block similarly contain an axially directed aperture, however, it is of a smaller diameter than the hole in protruding block 22 and is internally threaded to receive a fastener bolt, in the case of the attachment of the column to the base, bolt 13. Extending along one of the two narrower sides of the rectangular columns is a rack 18 having gear teeth thereon which are adapted to receive the teeth of a rotatable pinion as described below. Columns 16 and 16a are identical and contain apertures 20 and 120 in the side of the column adjacent the protruding block 22. The aperture 20 gives access to position and tightens the bolts used to attach end adjacent column sections together. The portion of a protruding block 22 extending beyond the end of column 16 fits within the adjacent column 16a into the recess location of recessed block 26 whereby the ends of the adjacent columns come into perimetric contact without contact between recessed block 26a and protruding block 22. A keyed structure preventing relative rotation between column 16a and 16 thus results with secure engagement of the axially adjacent columns.

Figure 5:
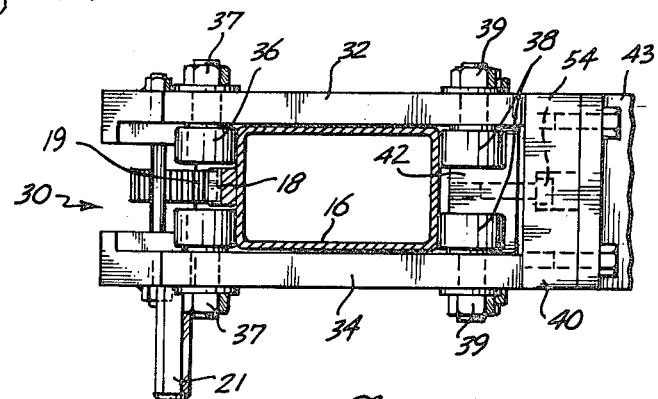
FIG. 5 is an enlarged cross-sectional view of the apparatus of FIG. 1 taken along the line 5—5 of FIG. 1.

A vertically movable carriage means 30 is shown in sliding relationship with column 16. The carriage means 30 as shown in FIGS. 1, 3 and 5 comprises first side plate 32 and second side plate 34 positioned in sliding engagement with the larger sides of column 16 and in a substantially parallel relationship to each other. Each side plate 32 and 34 carries two sets of cam roller means 36 and 38 mounted upon axes perpendicular to the plan of each side plate. The cam roller means 36 and 38 are adapted to roll upon the opposed minor surfaces of the rectangular column 16 to support and orient the carriage 30 with respect to the column 16. The first set of cam roller means 36 carried by each plate comprise upper and lower cam rollers 36 securely but rotatively mounted to the first and second side plates 32 and 34 by mounting bolts 37. The second set of cam roller means 38 comprise upper and lower movable cam rollers 38 which are adjustably and rotatively mounted by adjustable mounting bolts 39 to side plates 32 and 34. An eccentric mounting permits adjustment of the distance between the rollers so that the carriage mechanism may be securely mounted upon column 16. Locking bolts 48 having the threaded nuts 49 and extending through sides plates 32 and 34 may be utilized to draw down and lock the carriage securely upon column 16 preventing any translation upper column 16.

The lock block 42 is used to set and lock the distance between side plates 32 and 34. Lock block 42 has a pair of apertures therethrough to receive width adjusting bolts 50 which extend through each of the side plates 32 and 34 and have nuts 52 at each end thereof drawing down upon nut 52 to cause side plates 32 and 34 to move together. Lock block 42 has a pair of threaded apertures extending perpendicularly to width adjusting bolts 50 to receive cap screws 54. These cap screws 54 extend through front plate 40 and serve to draw front plate 40 and lock block 42 together when tightened. The end edges of side plates 32 and 34 are perpendicular to sides 32 and 34 and abut one face of front plate 40. When cap screws 54 are tightened, they draw lock block 42 toward front plate 40 so that the distance between side plates 32 and 34 is locked by engagement with front plate 40.

In FIG. 1 there is shown one means for attaching the column 16 to a base. The vertical column 16 is securely attached to a base 10 by means of a single removable bolt 13. Leveling bolts 12 are provided at each corner of the tool stand base 10 to facilitate adjustable mounting of the bore 10 to floor 11. A slot 14 permits translation of the end of column 16 across the top face of bore 10 to any desired location, bolt 13 being inserted through slot 14.

Another means for column mounting is one in which a pivotal engagement permitting drilling at other than right angles with respect to the base 70 can be accomplished. In FIG. 2 the pivotal means shown generally at 68 is mounted upon base frame means 70 by use of mounting bolt 73 threaded into base block 93. A pivot axis 95 as shown in FIG. 4 is provided by an aperture through base block 93 which is adapted to receive threaded locking pin 97. Pivotal block 91 is supported in engagement with base block 93 by threaded locking pin 97. Lock bushing 99 bears upon one side of base block 93 while pivotal block 91 bears upon the other side when threaded lock pin 97 is tightened. Lock bushing 99 has an upwardly extending key 100 which fits into a recess in pivotal block 91 restraining relative rotation between pivotal block 91 and lock bushing 99. The pivotal block 91 in turn is attached to column 76 by means of a bolt 89 inserted through bolt hole 84 into threaded hole 88 in the recessed block 86. Thus a rigid mounting arrangement is provided having the capability of varying the angular relationship of the column 76 with respect to the base 70.

Figure 6:
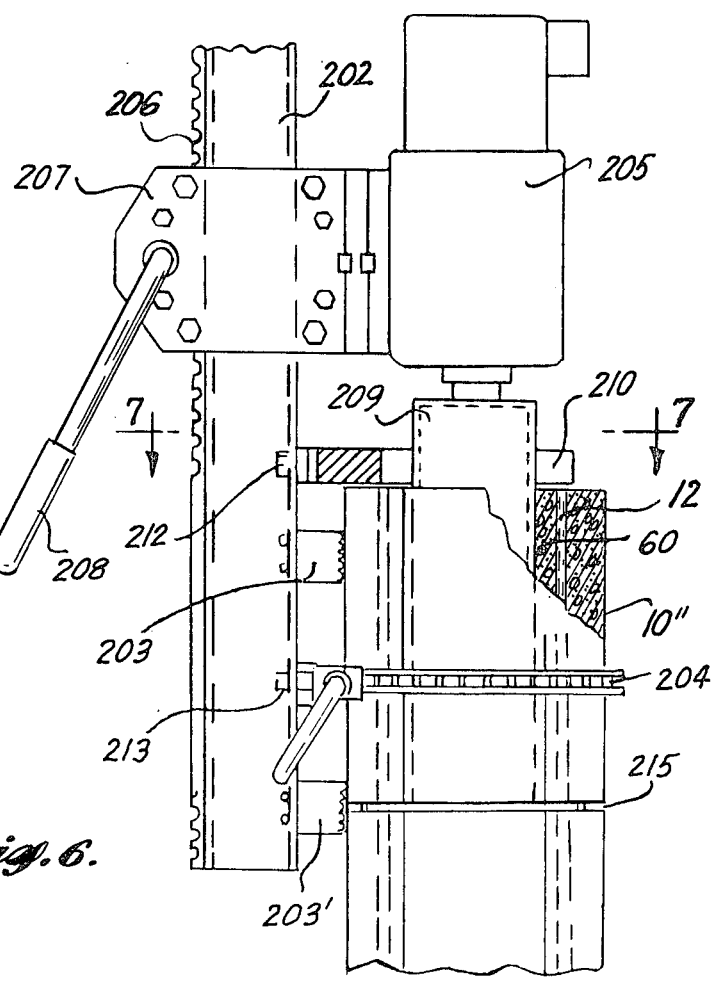
FIG. 6 is a side elevational view, partially cut away of the apparatus of this invention engaging a concrete piling.

Yet another means for tool stand attachment is shown in FIGS. 6 and 7. FIGS. 6 and 7 show a columnar tool stand for engagement with a vertical piling 200 comprising a vertical column 202, a support collar 210 fixed by means of bolts standoff pads 203 and 203' engagement with a surface of the piling 200 and a surface of the column 202 and a tightening collar 204 fixed to the column 202 by means of bolts 213. The perpendicular support collar 210 supports the weight of the column 202 and a slidably mounted carriage 207 and drill 205 atop the piling 200. The tightening collar 204 located intermediate of the standoff pads 203 encircles the piling 200, and, when tightened, firmly engages the column 202 standoff pads 203 and piling 200 in a manner which is rigid enough for satisfactory tool operation.

The carriage 207 carrying the drill 205 and core drill bit 209 is slidably mounted on the column 202 and internally engaged as hereinabove described with a toothed rack 206 fixed to one side of the column 202. An operator merely turns the handle 208 of the carriage 207 to move the carriage along the rack 206 and column 202. The drill bit 209 is lowered into and drawn out of the concrete piling 200 by means of the movement of the carriage 207 upon the column 202.

INDUSTRIAL APPLICABILITY

The apparatus shown in the drawings and described above finds application in the support of rock and concrete drilling and cutting devices such as core drilling apparatus wherein a rigid mounting structure having a capability of holding the drilling or cutting mechanism is a specific angular orientation with respect to the base of the tool stand is necessary while permitting translation of the drill along a set course.

The apparatus of FIGS. 6 and 7 is used when it is desired to perform cutting or core drilling operations on a concrete pillar or concrete piling 200 as shown in FIGS. 6 and 7. In this process it is desired to expose rebar from the vertical piling 200 for use in subsequent construction such as by casting into a concrete cross beam. In order to complete this construction process some rebar 216 above the specified elevation of the vertical piling is necessarily left intact.

To establish the elevation of a cast-in-place cross beam at the kerf line 215 of FIG. 6, for instance, the kerf line 215 would first be cut outside the rebar 216 of the piling 200. A suitable device for cutting the concrete pillar or piling is shown in my co-pending United States patent application, Ser. No. 82,954 filed Oct. 9, 1979 entitled METHOD AND APPARATUS FOR CUTTING CONCRETE COLUMNS and in a continuation-in-part thereof, Ser. No. 119,983 filed Feb. 8, 1980 and entitled METHOD OF PREPARING CONCRETE COLUMN FOR ATTACHMENT TO BEAM. The column segment 202 having the support collar 210 and standoff pads 203 and 203' is then tightened to the column 200 by means of the chain tightening device 204. Collar 210 rests firmly upon the end of concrete piling 200. The core drill 205 and core drill bit 209 are mounted to the column 202 by means of the carriage 207. The operator of the apparatus activates the drill and then turns the handle 208 to move the carriage 207 along the column 202 so that the drill bit 209 axially engages the piling 200 to drill down to the elevation of kerf 215. One or several holes may be drilled. Once core drilling has removed a major portion of the concrete between the rebars 216 the remaining concrete can be crushed and removed and the elevation of the cast-in-place concrete cross beam thereby established at kerf 215 with a minimum of spalling or breakage of concrete.

Of course, the apparatus described herein may be used for other cutting, drilling or similar procedures needed at the end of near the end of a concrete or other elongated member.

The present invention has been described above with reference to a specific structural arrrangement which illustrates a presently preferred embodiment of the invention. The foregoing description has been presented in furtherance of this presently preferred embodiment and is not intended to be an exhaustive catalogue of all forms which the structure according to this invention may assume.

I claim:

1. A tool mounting apparatus used for positioning and manipulating a tool at or near the end of elongated workpieces comprising:

an elongated rectangular column having a toothed rack extending along one side thereof; said column comprising at least one column segment, each column segment having a protruding block fastened into a first end thereof and a recessed block fastened into the second end thereof; said protruding block adapted for insertion into said second end of another column segment end adjacent thereto; said protruding block and said recessed block having apertures therein allowing a threaded fastener to axially retain two adjacent segments in peripheral contact without face-to-face contact of said protruding block and said recessed block;

support means for encircling and tightening said column to said workpiece in a substantially parallel orientation to said workpiece;

a support collar, mounted at right angle to said column for bearing the weight of said tool mounting apparatus upon the end of said workpiece;

carriage means slidably mounted on said column, said carriage means having a pinion means engaging said toothed rack whereby rotation of said pinion means moves said carriage means along said column thereby providing movable support for a tool mounted thereon.

2. The apparatus of claim 1 further comprising:

a carriage means slidably mounted on said column, said carriage means comprising (1) first and second side plates, said first and second side plates each carrying opposed spaced apart roller means mounted for rotation about an axis perpendicular to said plates, one of said roller means mounted for movement toward and away from another of said roller means whereby said column is captured between said opposed spaced apart roller means, (2) means to vary the distance between said first and second side plates and to lock said first and second side plates at a distance apart to receive said column therebetween (3) a drive pinion mounted for rotation on an axis perpendicular to the longitudinal axis of said column and engaging said rack.

3. The apparatus of claim 1 wherein said column is made up of end adjacent column segments, said segments being substantially hollow and rectangular.

4. The apparatus of claim 3 wherein a concrete cutting and/or drilling device is attached to said carriage means whereby cutting and/or drilling of said member is accomplished by translation of said carriage means along said column.

5. The apparatus of claim 4 wherein said concrete cutting and/or drilling device is a core drill.

6. The apparatus of claim 5 wherein said drill is positioned coaxially with respect to said member.

7. The apparatus of claim 1 wherein said support means is a flexible, fastener fixed at one end thereof to said column and releasably connected at the other end thereof to said column and having means to adjust the length thereof to tighten said column into contact with said workpiece.

8. The apparatus of claim 1 further including standoff pads attached to said column and adapted to engage said workpiece in a secure support relationship.

9. The apparatus of claim 1 wherein said support collar has a centrally located aperature permitting insertion of a drill bit therethrough and into drilling contact with the end of said member.

* * * * *